(12) United States Patent
Fusi (10) Patent No.: US 7,831,340 B2
(45) Date of Patent: Nov. 9, 2010

(54) LOCAL DIGITAL VALVE CONTROLLER UNIT

(75) Inventor: Leonardo Fusi, Montespertoli (IT)

(73) Assignee: Control Components, Inc., Rancho Santa Margarita, CA (US)

( * ) Notice: Subject to any disclaimer, the term of this patent is extended or adjusted under 35 U.S.C. 154(b) by 222 days.

(21) Appl. No.: 11/945,070

(22) Filed: Nov. 26, 2007

(65) Prior Publication Data

US 2009/0138128 A1 May 28, 2009

(51) Int. Cl.
| | |
|---|---|
| G05D 7/00 | (2006.01) |
| G05D 11/00 | (2006.01) |
| G05D 9/00 | (2006.01) |
| G05B 13/02 | (2006.01) |
| G06F 3/00 | (2006.01) |
| G06F 5/00 | (2006.01) |
| H05K 7/02 | (2006.01) |
| H05K 7/04 | (2006.01) |

(52) U.S. Cl. .................. 700/282; 700/42; 700/281; 710/2; 710/60; 361/809

(58) Field of Classification Search ............ 700/42, 700/276, 282, 281; 710/1, 2, 5, 6, 58, 60; 361/600, 679.01, 807, 809
See application file for complete search history.

(56) References Cited

U.S. PATENT DOCUMENTS

| | | | |
|---|---|---|---|
| 4,471,620 A | | 9/1984 | Binstock et al. |
| 4,500,408 A | * | 2/1985 | Boys et al. ............. 204/298.03 |
| 4,700,315 A | * | 10/1987 | Blackburn et al. .......... 700/207 |
| 5,623,402 A | * | 4/1997 | Johnson ...................... 700/42 |
| 5,798,910 A | * | 8/1998 | Holbeche et al. ............ 361/809 |
| 5,818,178 A | * | 10/1998 | Marumoto et al. ..... 318/400.32 |
| 6,055,459 A | * | 4/2000 | Lawrence .................... 700/42 |
| 6,154,686 A | * | 11/2000 | Hefferen et al. ............. 700/276 |
| 6,184,641 B1 | * | 2/2001 | Crimmins et al. ........... 318/466 |
| 6,329,013 B1 | * | 12/2001 | Putt ............................. 427/8 |
| 6,512,960 B1 | * | 1/2003 | Schulz ........................ 700/56 |
| 6,588,499 B1 | * | 7/2003 | Fahlsing ..................... 165/231 |
| 6,797,063 B2 | * | 9/2004 | Mekias ........................ 118/52 |
| 7,049,612 B2 | * | 5/2006 | Quach et al. ............. 250/492.3 |
| 7,059,551 B2 | * | 6/2006 | Giberson et al. .............. 241/34 |

(Continued)

FOREIGN PATENT DOCUMENTS

JP          57018513 A  *  1/1982

(Continued)

*Primary Examiner*—Crystal J Barnes-Bullock
(74) *Attorney, Agent, or Firm*—Stetina Brunda Garred & Brucker (57) ABSTRACT

A controller assembly is adapted for regulating at least one valve having a valve positioner. The controller assembly comprises a digital controller having a plurality of data inputs and data outputs and includes at least one proportional-integral-derivative (PID) controller operative to modulate the valve positioner in response to data received at the data inputs. The digital controller is configured to perform the following functions within a total time period of no greater than 10 ms: acquisition of data at the data inputs, processing of the data, and transmission of data from the data output in order to regulate the valve(s). The digital controller may include a quantity of at least sixteen digital inputs, at least sixteen digital outputs, at least eight analog inputs and at least eight analog outputs.

22 Claims, 6 Drawing Sheets

U.S. PATENT DOCUMENTS

| | | | |
|---|---|---|---|
| 7,155,319 B2 * | 12/2006 | Nangoy et al. | 700/281 |
| 7,267,529 B2 * | 9/2007 | Taylor | 415/169.1 |
| 7,327,045 B2 * | 2/2008 | Watkins | 290/1 R |
| 2003/0234371 A1 * | 12/2003 | Ziegler | 250/423 R |
| 2006/0259259 A1 * | 11/2006 | Rozenboim et al. | 702/83 |
| 2007/0005159 A1 | 1/2007 | Borah et al. | |

FOREIGN PATENT DOCUMENTS

| | | | |
|---|---|---|---|
| JP | 62198429 A | * | 9/1987 |

* cited by examiner

LOCAL DIGITAL VALVE CONTROLLER UNIT

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention is related generally to fluid control systems and, more particularly, to a uniquely configured valve controller assembly having a deterministic digital controller with increased input and output capabilities and being configured to operate under a reduced cycle time and which is packageable in a small, explosion-proof and waterproof container that can optionally be located near the valve(s) to be controlled.

Steam turbine power plants typically employ steam as a working fluid wherein a turbine section of the power plant extracts heat from the steam for conversion to mechanical energy and, ultimately, for the generation of electricity. A turbine bypass system is typically included in many steam turbine power plants. The turbine bypass system may include a turbine bypass valve as a means to divert steam continuously produced by the boiler around the turbine section. The turbine section itself may be comprised of several turbines which may be arranged in series. A reheater may be included between each one of the turbines for reheating the steam after passing through each turbine. After exiting the turbine section, the steam may be delivered to a condenser wherein the steam is transformed into water which may be recycled to the boiler.

When the turbine bypass system is actuated, the heat of the steam which would otherwise be extracted by the turbines must be cooled in order to prevent damage to the reheater and the condenser as a result of thermal shock. One method of reducing the temperature of the steam in the bypass system is to inject a spray of cooling water into the flow of superheated steam. The amount of cooling water that is sprayed into the flow of steam must be controlled in order to prevent other problems to downstream components. For example, if an excess amount of cooling water spray is injected into the flow of the superheated steam, complete mixing and evaporation of the cooling water spray will not occur and the non-evaporated cooling water may cause damage to system components.

Various controller configurations have been developed in the prior art in order to control both the turbine bypass valve as well as the spray water valve. Typically, controllers receive various sensor inputs such as steam temperature, steam flow rate, cooling water spray flow rate and other parameters such as the position of the turbine bypass valve and the spray water valve in regulating the turbine bypass system. Such parameters must be accurately measured and processed by the controller in order to allow for accurate control of the turbine bypass valve and spray water valve.

The accuracy with which the controller regulates such valves can impact the operating efficiency of the power plant and can have a bearing on the life expectancy and maintenance requirements. As may be expected, an increased quantity of input signals in the form of field measurements of temperature, flow rate, and valve position can result in a proportionate increase in controller accuracy, stability and reliability.

Many of the prior art controllers which have been developed are limited in the amount of data inputs that can be processed. In addition, many prior art controller are limited to installation in control rooms necessitating the routing of multiple communication lines (i.e., cabling) from the controller to the valves of the turbine bypass system. Furthermore, many controllers of the prior art have a limited temperature range within which the controller can be reliably operated. Even further, many controllers of the prior art are unsuitable for installation in hazardous areas such as those commonly found in severe service environments in the oil and gas industry.

Perhaps an even more noteworthy deficiency of prior art controllers is the relatively lengthy scan time required in acquiring and processing the various input (i.e., sensor) signals and generating output signals that are necessary to regulate operation of the turbine bypass system. As may be appreciated, a lengthy scan time for the controller can result in reduced reliability, flexibility and efficiency in monitoring and regulating the operation of the turbine bypass system.

As can be seen, there exists a need in the art for a controller assembly capable of controlling a group of valves such as for a turbine bypass system and which is capable of quickly and accurately processing a large quantity of input signals and generating appropriate output signals. Furthermore, there exists a need in the art for a controller assembly which is capable of reliably operating in severe service applications within a wide range of temperature and humidity extremes. For example, there exists a need in the art for a controller assembly which is suitable for installation in hazardous areas that are commonly found in critical control environments associated with the power, oil and gas industries. Finally, there exists a need in the art for a controller assembly that provides the above-described features in a compact size to allow mounting in the field directly adjacent the valves to be controlled.

BRIEF SUMMARY OF THE INVENTION

The present invention specifically addresses and alleviates the above-referenced deficiencies associated with controller assemblies for valves. More particularly, in one aspect, the present invention includes an improved controller assembly that is specifically adapted for regulating at least one valve or valve group. The controller assembly comprises a deterministic digital controller having the capability to process a large quantity of input signals and generate appropriate output signals in a relatively short scan time. The controller assembly may include at least one proportional integral derivative (PID) controller.

The digital controller is operative to modulate each valve in response to data received at the data inputs of the digital controller. Notably, the digital controller is specifically configured to acquire, process and transmit data in a short period of time, depending upon the complexity of the algorithm upon which the digital controller operates. More specifically, the digital controller is preferably configured to acquire data at the data inputs, process the data via the included software algorithms, and transmit the data from the data output in the form of control variable (CV) signals sent to the valve positioners.

In one embodiment, the controller assembly may be adapted for regulating a turbine bypass system having a valve group comprising at least a turbine bypass valve and/or a spray water valve. As known in the art, turbine bypass valves are specifically adapted for regulating the downstream and/or upstream pressure and/or temperature of steam in the turbine bypass system. The turbine bypass valve discharges a portion of steam flowing through the turbine bypass system into a condenser whereafter water from the condensed steam is recycle back to the boiler. As is also known in the art, the spray water valve is specifically configured to reduce the temperature of the steam prior to discharge to the condenser in order to prevent damage to the condenser.

The deterministic digital controller is preferably based upon a programmable logic controller (PLC) having a main processor of any suitable speed and memory. For example, in one embodiment, the processor is preferably a 400 MHz FreeScale Real-Time processor that is based on field programmable gate array (FPGA) technology. However, any controller of any speed may be used. The controller may operate a control routine and an auxiliary routine which communicate with one another in order to regulate the valves in the valve groups.

Advantageously, the digital controller includes the capability for acquiring, processing and transmitting a large quantity of signals at the data inputs and data outputs. In one embodiment, the digital controller includes a quantity of at least sixteen (16) digital inputs and at least sixteen (16) digital outputs which are preferably 24 Vdc signals provided in separate channels that are preferably isolated from one another as well as from ground.

Additionally, the digital controller preferably includes a quantity of at least eight (8) analogue inputs and at least eight analogue outputs which are provided as 4-20 milliamp (mA) signals which are isolated from one another as well as from ground and which may be short-circuit protected such as by a fuse. Signal conversion may be rated at fourteen-bit digital resolution. The analogue inputs may be expandable to sixteen (16) inputs. The digital controller may include at least four (4) temperature inputs and other inputs such as flow rate of the cooling water and flow rate of the steam. The four (4) temperature inputs may be expandable to at least eight (8). The temperature inputs may be provided by appropriate sensors such as thermocouples (T/C's) and/or resistance temperature detectors (RTD's).

The controller assembly is packaged in a relatively compact size and may be housed in a container that is waterproof and/or explosion proof in order to facilitate mounting the controller assembly directly adjacent to the valves or valve groups. In one embodiment, the container may have a length, width and size that is less than approximately 500 millimeters (mm) by 500 mm by 300 mm, respectively. Furthermore, the container may be configured to occupy a volume which is less than approximately less than 0.75 m³.

The controller assembly is configured to operate in harsh environments such as within a temperature range of approximately −20° C. to +60° C. and within a humidity range of between approximately 5% to 95%. The digital controller may be configured to be operated by remote control such as via a small electronic device (e.g., palm-sized device) that is communicative with the digital controller via a Wifi hub or plurality of Wifi hubs or via other suitable wireless mediums. The remote control device may be configured to allow for regulation of the controller assembly and for diagnostic testing, programming and monitoring.

The present invention is best understood by reference to the following detailed description when read in conjunction with the accompanying drawings.

BRIEF DESCRIPTION OF THE DRAWINGS

These and other features of the present invention will become more apparent upon reference to the drawings wherein like numbers refer to like parts throughout and wherein.

Common reference numerals are used throughout the drawings and detailed description to indicate like elements.

DETAILED DESCRIPTION OF THE INVENTION

Figure 1:
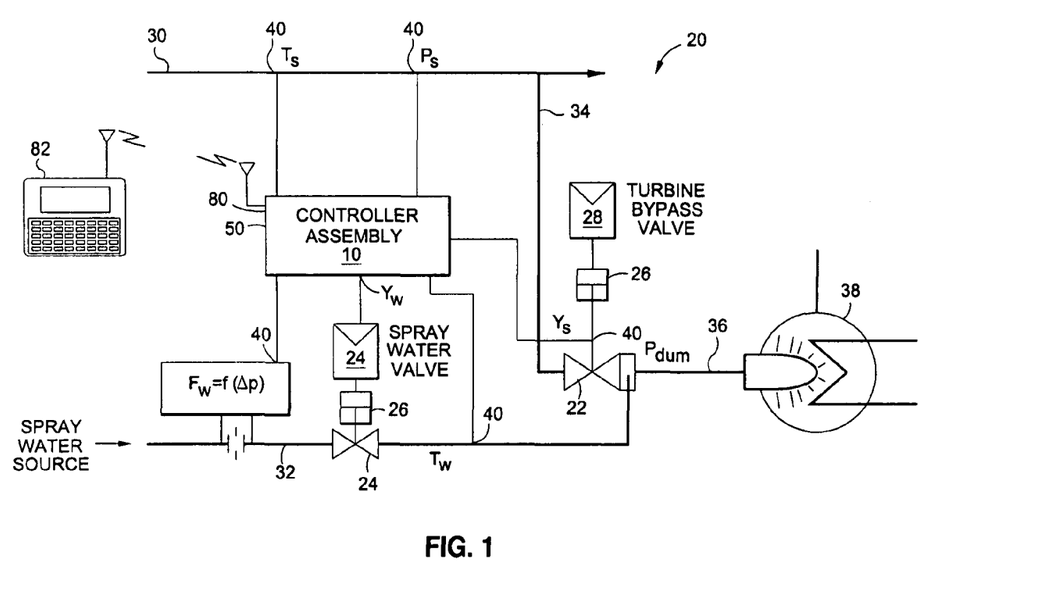
FIG. 1 is a schematic diagram illustrating a controller assembly in an exemplary embodiment for controlling a valve group comprising a spray water valve and a steam bypass valve.

The present invention will now be described with particular reference to the accompanying drawings wherein FIG. 1 is a schematic diagram of a turbine bypass system 20 implementing a controller assembly 10. As illustrated in FIG. 1, the turbine bypass system 20 includes a turbine bypass valve 22 and a spray water valve 24 for regulating the flow of steam through the turbine bypass system 20 prior to discharge from a condenser 38. As can be seen in FIG. 1, the turbine bypass system 20 includes a hot reheat header 30 through which steam flows. A portion of the steam in the hot reheat header 30 flows into a bypass line 34 and, depending upon the opening condition of the turbine bypass valve 22, a portion of that steam is discharged into a dump tube 36 that is connected to the condenser 38. The spray water valve 24 is utilized to regulate the temperature of the steam flowing into the condenser 38 in order to avoid damage to the condenser 38 as a result of thermal shock.

The controller assembly 10 is specifically adapted for regulating the spray water valve 24 and turbine bypass valve 22 which collectively comprise at least one valve group 12. In this regard, it should be mentioned that the controller assembly 10 may be applied to various other systems and applications in addition to the steam bypass control described herein. For example, the controller assembly 10 may be applied to control applications such as for compressor antisurge control, steam turbine control, and a variety of other applications. In this regard, the controller assembly 10 is uniquely suitable for use in any system requiring high performance response. As may be appreciated, performance of the controller assembly 10 is dependent upon the quantity of data inputs 58 and outputs 60 available with the controller assembly 10. The flexibility to which the controller assembly 10 may be adapted to different systems is due in part to its fully programmable capability as will be described in greater detail below.

Referring still to FIG. 1, the controller assembly 10 is shown in the turbine bypass system 20 for controlling the valve group 12 comprised of the turbine bypass valve 22 and the spray water valve 24. In this regard, it should be noted that the controller assembly 10 may be further configured to regulate any number of groups of valves such that there is no fixed or maximum number of valves that may be controlled. As was mentioned above, limitations on the total number of valves that may be regulated by the controller assembly 10 is primarily dependent upon hardware capability in terms of the quantity of input and output signals which must be acquired, processed and generated by the controller assembly 10.

Figure 4:
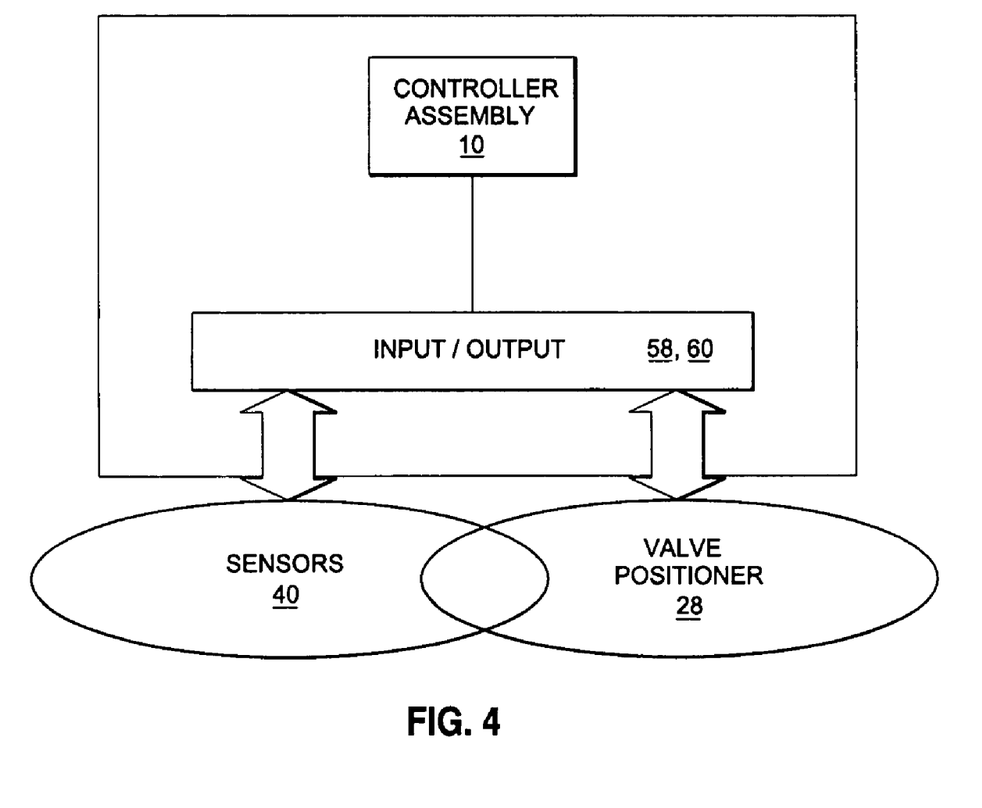
FIG. 4 is a schematic diagram illustrating a controller assembly in communication with a plurality of sensors and a valve positioner such as of the steam bypass valve and spray water valves.

Referring to FIG. 4, in its broadest sense, the controller assembly 10 comprises a deterministic digital controller 50 which is configured to acquire data (i.e., sensor 40 input) at the data inputs 58, process the data, and transmit data from the data outputs 60 for regulating the positioners 28 of the spray water valve 24 and the turbine bypass valve 22. More particularly, the digital controller 50 is configured to perform a variety of functions in an extremely short period of time. For example, the digital controller 50 of the present invention is configured to acquire data received at the data inputs 58, process the data via a suitable software algorithm operated by the digital controller 50, and transmit the data from the data outputs 60 within a total time period of no greater than ten (10) milliseconds (ms) operating in a relatively complex software algorithm.

However, for a relatively simplistic software algorithm of the type utilized for regulating the spray water valve 24 and turbine bypass valves 22 of the turbine bypass system 20, it is contemplated that the digital controller 50 may perform the data acquisition, data processing and data transmission functions within a time period of less than approximately one (1) ms. In a preferred embodiment, the digital controller 50 is preferably based upon a programmable logic controller (PLC) having a main processor 52 that is preferably a 400 MHz FreeScale Real-Time processor 52 although processors of any speed any type may be used. The processor 52 is preferably based upon field programmable gate array (FPGA) technology although any other suitable processor configuration may be implemented.

As shown in FIG. 1, the digital controller 50 acquires data at data inputs 58 from a plurality of field sensors 40 which are preferably in hardwire communication with the digital controller 50. The sensors 40 may include a steam pressure ($P_s$) sensor 40 and a steam temperature ($T_s$) sensor 40 for measuring pressure and temperature of steam flowing through the hot reheat header 30 as illustrated in FIG. 1. Likewise, the digital controller 50 may be in hardwire communication with sensors 40 adapted to measure the spray water characteristics including a spray water pressure ($P_w$) sensor 40 and a spray water temperature ($T_w$) sensor 40. A spray water flow ($F_w$) sensor 40 may be mounted on a spray water line 32 as illustrated in FIG. 1 for providing spray water flow data to the digital controller 50.

In one embodiment, the spray water flow sensor 40 measurements may be provided by measuring the change in enthalpy or energy across a length of the spray water line 32 in order to determine the corresponding spray water flow through the spray water line 32. Other measurement signals which may be provided to the digital controller 50 at the data inputs 58 may include a turbine bypass valve 22 position ($Y_s$) sensor 40 as well as a spray water valve 24 positioned ($Y_w$) sensor 40. Even further, the turbine bypass system 20 may include a condenser 38 pressure ($P_{dum}$) sensor 40. The digital controller 50 receives data provided by the above-described sensors 40 and generates control signals for regulating the position of the spray water valve 24 and turbine bypass valve 22.

Referring still to FIG. 1, in a preferred embodiment, the digital controller 50 preferably includes a quantity of at least sixteen (16) digital inputs 58 and at least sixteen (16) digital outputs 60. The digital controller 50 further preferably includes a quantity of at least eight (8) analog inputs 58 and at least eight (8) analog outputs 60. However, it is contemplated that the digital controller 50 is configured to allow expansion of the quantity of analog inputs 58 to a total of sixteen (16) or more. Likewise, the digital controller 50 preferably includes at least four (4) temperature inputs 58 and is preferably configured to allow for expansion to a total of eight (8) or more temperature inputs 58. The temperature inputs 58 are preferably provided by sensors 40 which may comprise thermocouples (T/C's) and/or resistance temperature detectors (RTD's). In one embodiment, the digital inputs 58 and outputs 60 are preferably configured to receive signals on separate channels at 24 Volts dc. Each channel is preferably isolated from ground as well as from other channels and is preferably short-circuit protected such as by a fuse or circuit breaker.

The analog outputs 60 are preferably configured to receive 4-20 milliamp (mA) signals on separate channels. Similar to the configuration for the digital inputs 58, each channel for the analog inputs is isolated from ground as well as from other channels and is preferably short-circuit protected by a fuse. The analog output 60 preferably includes signal conversion which is rated at 14 bit digital resolution.

Referring briefly to FIG. 4, shown is a schematic diagram of a controller assembly 10 in communication with the plurality of sensors 40 for providing data to the inputs 58 of the controller assembly 10. Likewise, the controller assembly 10 is further in communication with the positioner 28 which is included with each of the spray water valve 24 and turbine bypass valve 22. Communication between the controller assembly 10 and the sensors 40 and valve positioner 28 is preferably by hardwire connection although wireless connection is contemplated. In a further embodiment, the controller assembly 10 may be configured to be placed in serial Ethernet communication between other controllers via a fiberoptic or a standard Ethernet communication or any other suitable communication medium.

Figure 2:
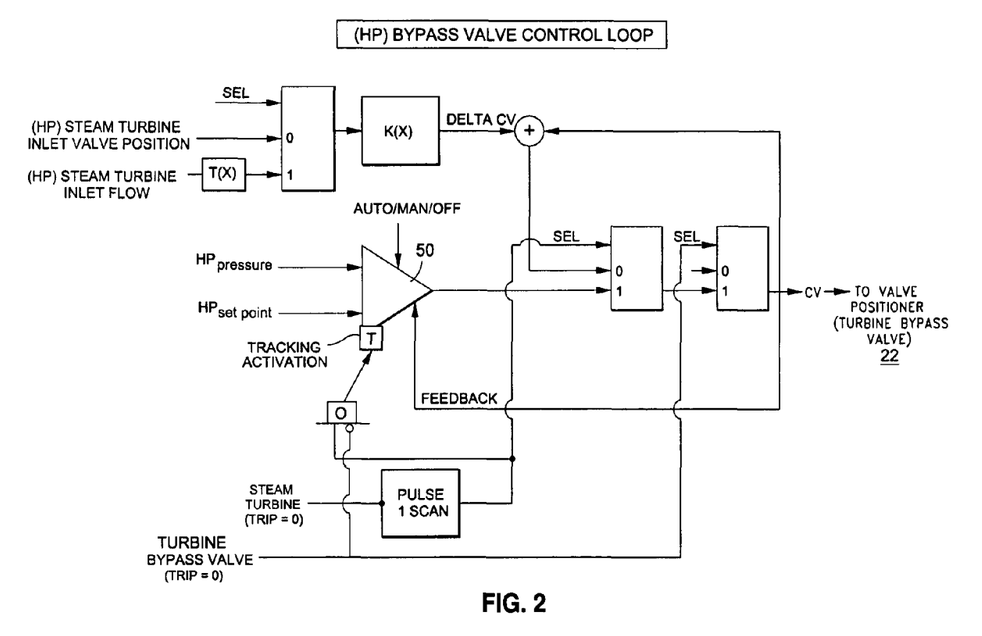
FIG. 2 is a schematic diagram of a control system for the steam bypass valve that may be regulated by the controller assembly.

Referring briefly to FIG. 2, shown is a turbine bypass valve 22 control loop such as may be used in a high pressure (HP) turbine bypass system 20. As was earlier mentioned, the turbine bypass valve 22 is regulated by the digital controller 50 and is used to control upstream and/or downstream steam temperature. Included in the valve control loop is a proportional integral derivative (PID) controller which is specifically configured to modulate valve position as a means for regulating pressure in the hot reheat header 30. Alternatively, where there is a predictable load or process variation such as a predicted pressure increase in the hot reheat header 30, the turbine bypass valve 22 can be repositioned by means of an anticipation function such as by reference to a preprogrammed look-up table wherein the positioner 28 moves an actuator 26 of the turbine bypass valve 22 corresponding to a pre-determined set of characteristics programmed into the look-up table.

As can be seen in FIG. 2, the turbine bypass valve 22 control loop accommodates various inputs such as steam turbine inlet valve position (ZT), steam turbine inlet flow rate (FT), in order to calculate flow based on differential pressure and temperature compensation. The turbine bypass valve 22 may be operated in various trip modes (TRP). In a turbine bypass valve (TRP=0) mode, the turbine bypass valve 22 is stroked incrementally as a function of the turbine inlet flow rate. Alternatively, in a steam turbine (TRP=0) mode, the turbine bypass valve 22 is moved to a completely open position. Depending on the mode of operation, a control variable (CV) (i.e., signal) is sent to the positioner 28 of the turbine bypass valve 22 for regulation thereof.

Figure 3:
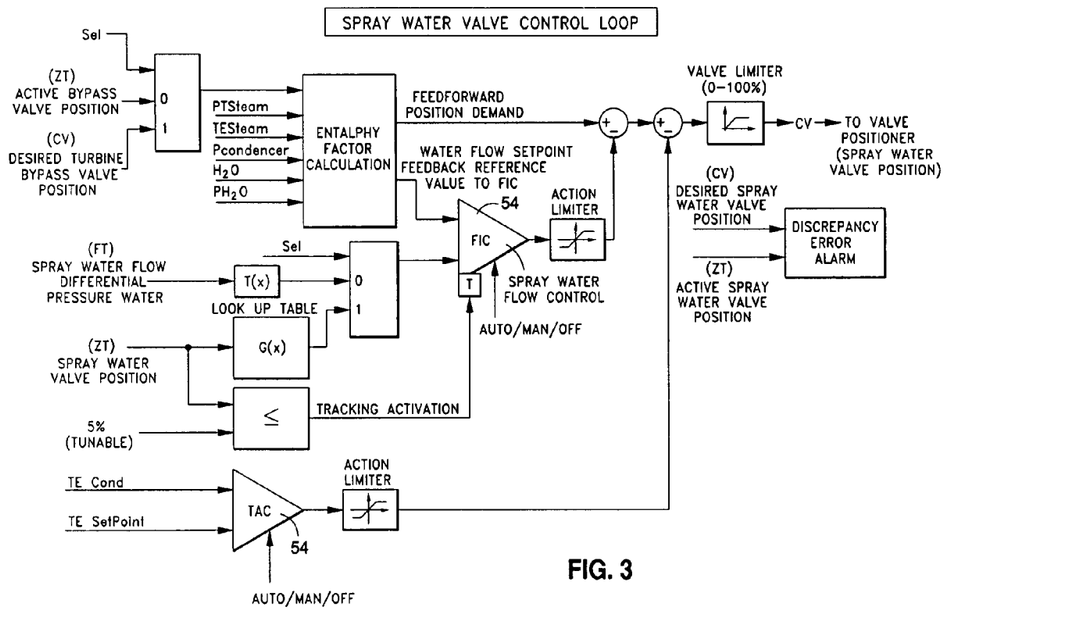
FIG. 3 is a schematic diagram of a spray water valve that may be regulated by the controller assembly.

Referring briefly to FIG. 3, shown is the spray water valve 24 control loop which, as was mentioned above, is utilized for reducing the temperature of the steam prior to discharged at the condenser 38. The spray water valve 24 is connected through the digital controller 50 and is regulated thereby in combination with a feed forward 56 and another PID controller 54. The feed forward 56 controls the spray water valve 24 position as a function of the position of the turbine bypass valve 22 opening. The PID controller 54 may be configured to function under several different operating modes. For example, the PID controller 54 may regulate the spray water valve 24 as a function of water flow through the spray water line 32 as illustrated in FIG. 1. As was earlier mentioned, determination of the rate of flow of the spray water through the spray water line 32 may be based on enthalpy calculations although other methodologies may be employed for determine spray water flow.

The PID controller 54 may also be operated as a function of downstream line temperature. However, it should be noted that operating the PID controller 54 as a function of water flow is a preferable mode for the case where desuperheated steam is discharged to the condenser 38. However, temperature control is the preferred PID controller 54 parameter for situations where the steam is discharged to a lower level steam header.

Figure 5:
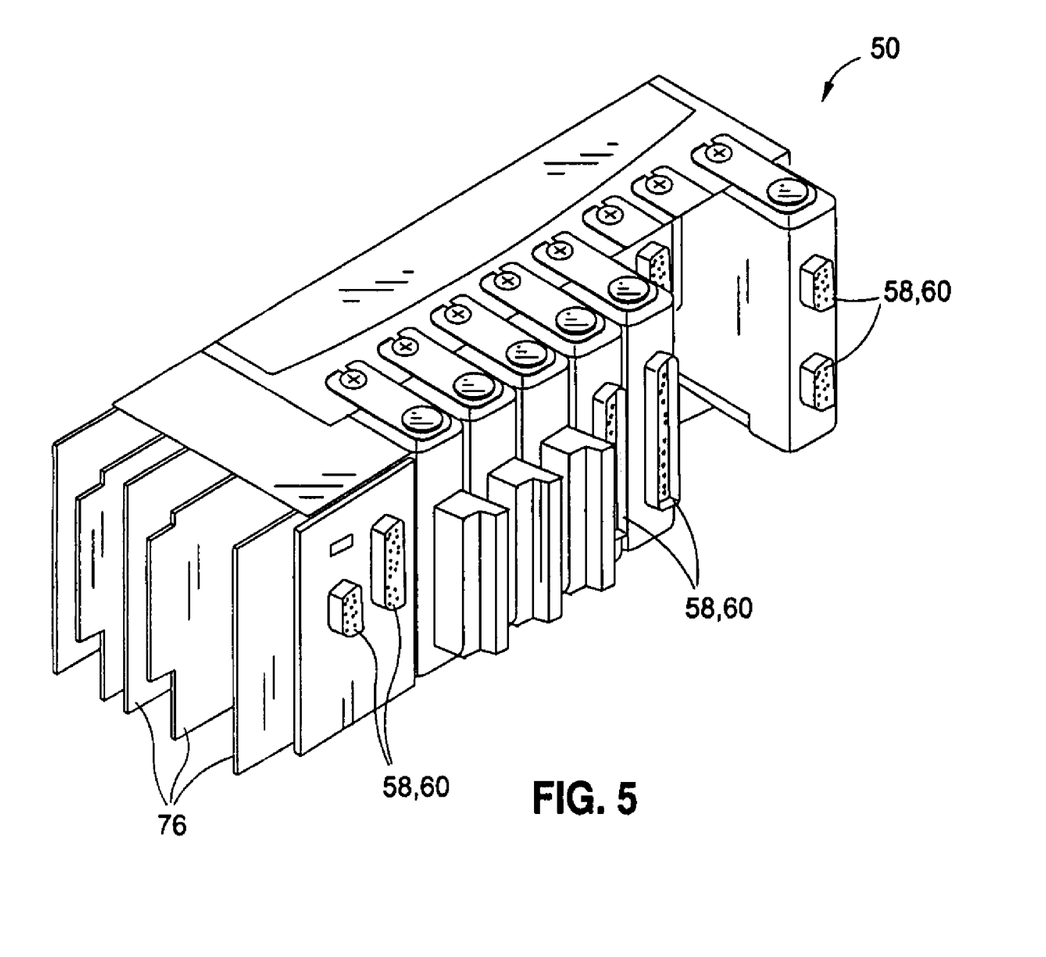
FIG. 5 is a perspective view of a hardware embodiment of the controller assembly.
Figure 6A:
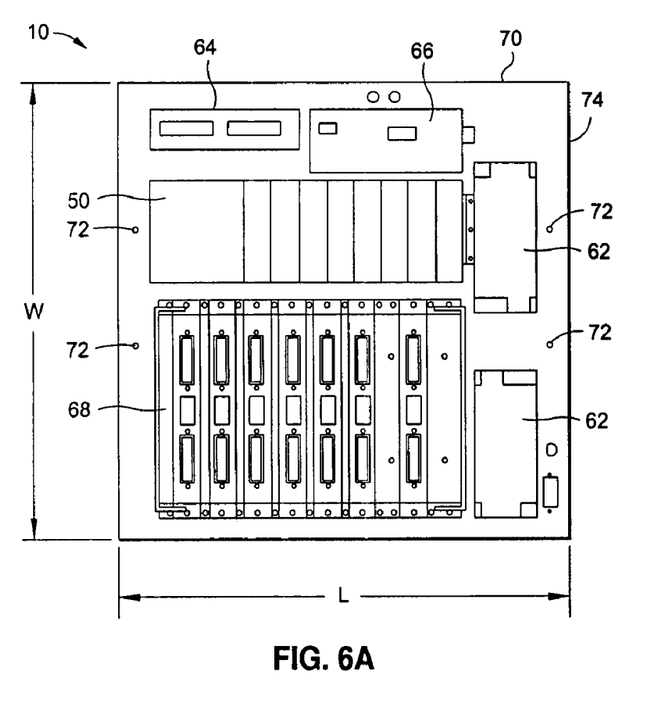
FIGS. 6A-6B are top and side views, respectively, of the controller assembly illustrated in FIG. 5.
Figure 6B:
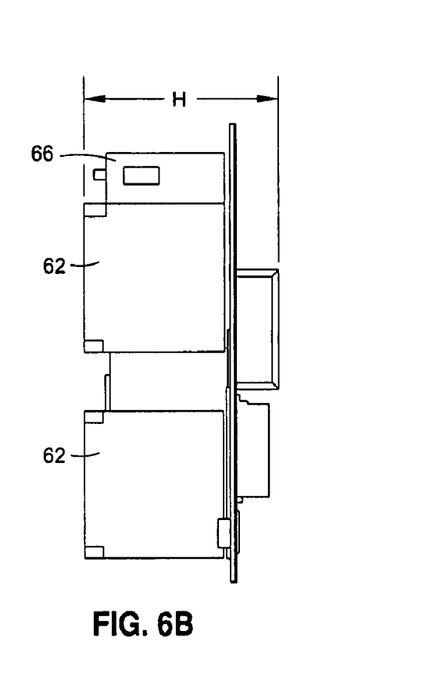

Referring now to FIGS. 5-6B, shown is the digital controller 50 in a hardware embodiment in FIG. 5 and as installed and integrated into the controller assembly 10. As was earlier mentioned, the digital controller 50 software is fully internal to the processor 52 incorporated into the digital controller 50. The software may include a pair of routines, namely, a control routine and an auxiliary routine, which communicate with one another via a memory or storage medium of the processor. Cooling fins 76 may be included with the controller assembly 10 as shown in FIG. 5. Data inputs 68 and data outputs 70 are exposed to facilitate hardwire connection to field sensors.

The memory may be subdivided depending upon type of service (i.e., input, output, internal) as well as depending upon type of data (i.e., Boolean, byte, integer, real, etc.). The memory of the digital controller 50 is globally defined in that all written software routines and serial connections may access the memory. Due to the fully programmable nature of the digital controller 50, customized functions may be readily integrated thereinto for the performance of specialized applications or particular control functions. Such customized functions may be implemented through the use of standard language or more complex language to allow for the execution of more complex software routines.

Referring more particularly to FIGS. 6A-6B, shown is a controller assembly 10 in one hardware embodiment illustrating a plurality of integrated components. For example, FIG. 6A illustrates the digital controller 50 mounted in a housing 70 or on a common platform 74 with a power supply 62, a power supply distributor 64, media converter 66, and a signal conditioner 68. Advantageously, the entire controller assembly 10 is packaged into a small size of approximately 500 mm length (L)×500 mm width (W)×300 mm height (H). The overall size of the controller assembly 10 is preferably such that the controller assembly 10 preferably occupies a volume less than approximately 0.75 cubic meters ($m^3$) although the controller assembly 10 may be packaged into an even smaller size. The small size of the controller assembly 10 facilitates mounting thereof directly adjacent the valve 14 that the controller assembly 10 is configured to regulate. Toward this end, mounting holes 72 may be included in the platform 74.

The controller assembly 10 is preferably mounted in a waterproof and/or explosion proof box that is suitable for installation in hazardous environments in the field. Furthermore, the controller assembly 10 and container are preferably configured to allow for operation in a wide variety of extreme environmental conditions. For example, the digital controller 50 is preferably configured to reliably operate between a temperature range of approximately −20° C. and +60° C. Furthermore, the digital controller 50 is preferably configured to reliably operate within a humidity range of between approximately 5% and approximately 95%.

In addition, the container is preferably configured to provide a high degree of vibration and shock resistance to allow mounting in severe environments adjacent to the valves. However, it is contemplated that the controller assembly 10 may be mounted in the conventional manner in a control room with hardwire connection between the controller assembly 10 and the valves. However, the preferred mounting arrangement of the controller assembly 10 is directly adjacent or near the valves in order to facilitate the later installation or retrofitting of additional equipment without the constraints associated with cabling into the close confines of a control room.

Referring briefly back to FIG. 1, the controller assembly 10 may be configured to be operated by remote control 82. In this regard, it is contemplated that the digital controller 50 is configured to wirelessly communicate through a suitable portable electronic device such as a palm device 82 which is communicative with a receiver 80 incorporated into the digital controller 50 via a Wifi hub. The portable device is preferably configured to allow for diagnostic testing of the processor 52 of the digital controller 50.

In one embodiment, it is contemplated that the Wifi hub is comprised of a single hub which allows for unobstructed communication via the remote control 82 within a long range (e.g., 300 meters) of the digital controller 50 (i.e.,) and within a shorter range (e.g., 15 meters) in enclosed or obstructed areas. However, additional Wifi hubs may be included in order to increase range as necessary. In a further embodiment, the controller assembly 10 may include a laptop or personal computer (PC) which is configured to allow for maintenance and system diagnostics of the controller assembly 10. Appropriate software is preferably installed in the controller assembly to allow for managing and configuring all programmable components of the digital controller 50.

Additional modifications and improvements of the present invention may also be apparent to those of ordinary skill in the art, thus, the particular combination of parts described and illustrated herein is intended to represent only certain embodiments of the present invention and is not intended to serve as a limitation of alternative devices within the spirit and scope of the invention.

What is claimed is:

1. A controller assembly adapted for regulating at least one valve group including at least a first valve and a second valve, the controller assembly comprising:

a deterministic digital controller including data inputs and data outputs configured to perform the following functions within a total time period of no greater than approximately 10 ms:

acquisition of data received at the data inputs representative of a first set of conditions associated with the first valve;

acquisition of data received at the data inputs representative of a second set of conditions associated with a second valve;

generating a first valve output in response to at least one of the first set of conditions and a second valve output in response to at least one of the first set of conditions and at least one of the and second set of conditions; and transmission of the first valve output data and the second valve output data from the data outputs to the respective first and second valves.

2. The controller assembly of claim 1 wherein the digital controller includes:
a quantity of at least sixteen digital inputs and at least sixteen digital outputs;
a quantity of at least eight analog inputs and at least eight analog outputs.

3. The controller assembly of claim 2 wherein the at least eight analog inputs are expandable to sixteen analog inputs.

4. The controller assembly of claim 1 wherein the digital controller includes at least four temperature inputs.

5. The controller assembly of claim 4 wherein the at least four temperature inputs are expandable to at least eight temperature inputs.

6. The controller assembly of claim 5 wherein the temperature inputs are in communication from at least one of a thermocouple and a resistance temperature detector.

7. The controller assembly of claim 1 wherein the scan time is no greater than approximately 1 ms.

8. The controller assembly of claim 1 further comprising an explosion-proof and waterproof container sized and configured to house the digital controller.

9. The controller assembly of claim 8 wherein the container has a size that is less than approximately 500 mm by 500 mm by 300 mm.

10. The controller assembly of claim 8 wherein the container is configured to occupy a volume less than approximately 0.75 $m^3$.

11. The controller assembly of claim 1 wherein the digital controller is configured to operate within a temperate range of approximately −20 degrees Celsius to approximately +60 degrees Celsius.

12. The controller assembly of claim 1 wherein the digital controller is configured to operate within a humidity range of between approximately 5 percent and approximately 95 percent.

13. The controller assembly of claim 1 wherein the digital controller is configured to be operated by remote control.

14. The controller assembly of claim 1, wherein the data representative of the first set of conditions is associated with a primary working fluid partially diverted by the first valve.

15. The controller assembly of claim 1, wherein the data representative of the second set of conditions is associated with a regulating fluid controlled by the second valve for combining with the diverted primary working fluid.

16. A controller assembly adapted for regulating a first valve having a first valve positioner and a second valve having a second valve positioner, the controller assembly comprising:
a digital controller having a plurality of data inputs and data outputs and including at least one proportional-integral-derivative (PID) controller operative to modulate the valve positioners in response to data received at the data inputs;
wherein the digital controller is configured to perform the following functions within a total time period of no greater than 10 ms:
acquisition of data received at the data inputs representative of a first set of conditions associated with the first valve;
acquisition of data received at the data inputs representative of a second set of conditions associated with a second valve;
generating a first valve output in response to at least one of the first set of conditions and a second valve output in response to at least one of the first set of conditions and at least one of the and second set of conditions; and
transmission of the first valve output data and the second valve output data from the data outputs to the respective first and second valve positioners.

17. The controller assembly of claim 16 adapted for regulating steam flow in a turbine bypass system having a valve group comprising at least one of a turbine bypass valve and a spray water valve, wherein:
the digital controller includes at least one PID controller;
the turbine bypass valve is regulated by the digital controller and the PID controller, the turbine bypass valve being configured to regulate steam pressure;
the spray water valve is regulated by the digital controller, a feed forward, and a PID controller, the spray water valve being configured to reduce steam temperature.

18. The controller assembly of claim 17 wherein the digital controller includes:
a quantity of at least sixteen digital inputs and at least sixteen digital outputs; and
a quantity of at least eight analog inputs and at least eight analog outputs.

19. The controller assembly of claim 17 wherein the digital controller includes at least four temperature inputs.

20. A controller assembly adapted for regulating at least one valve group including at least one valve, the controller assembly comprising: a deterministic digital controller configured to perform the following functions within a total time period of no greater than approximately 10 ms: acquisition of data received at the data inputs; processing of the data; and transmission of data from the data outputs; and an explosion-proof and waterproof container sized and configured to house the digital controller and having a size that is less than approximately 500 mm by 500 mm by 300 mm.

21. A controller assembly adapted for regulating at least one valve group including at least one valve, the controller assembly comprising: a deterministic digital controller configured to perform the following functions within a total time period of no greater than approximately 10 ms: acquisition of data received at the data inputs; processing of the data; and transmission of data from the data outputs; and an explosion-proof and waterproof container sized and configured to house the digital controller and to occupy a volume less than approximately 0.75 $m^3$.

22. A controller assembly adapted for regulating at least one valve group including at least one valve, the controller assembly comprising:
a deterministic digital controller configured to perform the following functions within a total time period of no greater than approximately 10 ms:
acquisition of data received at the data inputs;
processing of the data; and
transmission of data from the data outputs; and
wherein the digital controller is configured to operate within a humidity range of between approximately 5 percent and approximately 95 percent.

* * * * *